United States Patent Office 3,346,693
Patented Oct. 10, 1967

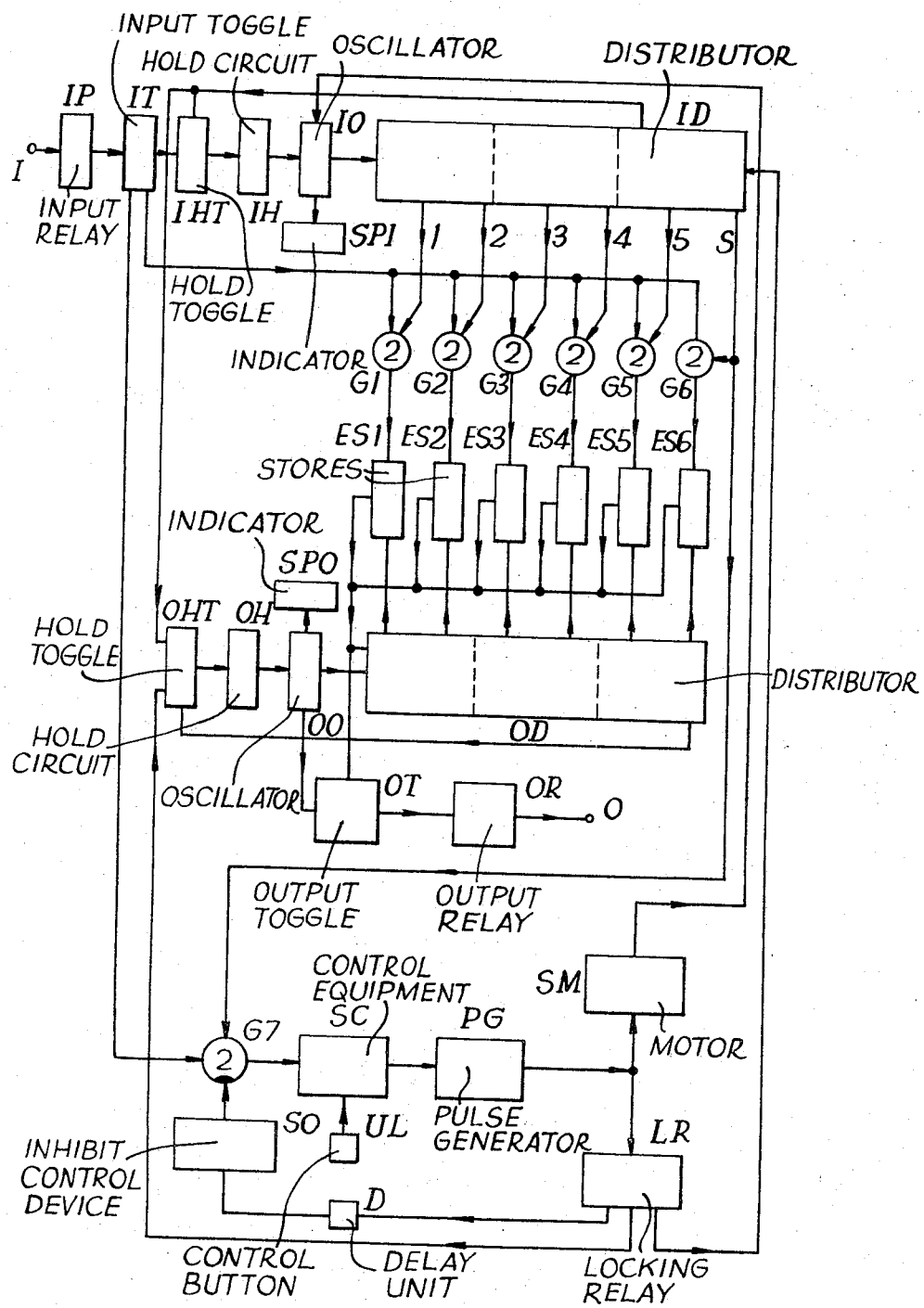

3,346,693
CONVERTERS FOR TELEGRAPH SIGNALS OR THE LIKE
Norman George Green and Edward Hodgson, Taplow, England, assignors to British Telecommunications Research Limited, Taplow, England, a British company
Filed Dec. 12, 1963, Ser. No. 330,148
5 Claims. (Cl. 178—26)

ABSTRACT OF THE DISCLOSURE

A converter for a start-stop telegraph system including a first distributor under the control of which an incoming signal character is sampled and storage devices are set accordingly, regenerator signals being produced under the joint control of the storage devices and a second distributor operating at a higher speed than the first. The speed of the first distributor is automatically adjusted to the speed of the incoming signals in response to two tests on the stop signal.

---

The present invention relates to converters for telegraph signals and is particularly concerned with arrangements whereby signals incoming at one speed may be converted to a different speed so as to be suitable for operating equipment designed to work at the said different speed.

According to present-day practice, incoming telegraph signals are generally used either to operate a reperforator so as to produce punched paper or serve for the direct operation of a teleprinter whereby a printed message is produced in alphabetical or numerical characters. For various reasons, however, telegraph transmission commonly takes place at a number of different speeds and if the signals are to operate a teleprinter, for instance, it may be necessary to employ a separate teleprinter for each speed concerned. Alternatively, if a single machine is to serve for any desired speed, some sort of mechanical adjustment needs to be made such as alteration of the governor. This cannot very readily be done and is likely to occupy an appreciable amount of time.

The present invention aims to overcome this difficulty by making use of a simple converter whereby the signals themselves are altered in speed so as to suit receiving equipment in standard adjustment. A further development of the invention permits automatic adjustment of the input circuits of the converter to the speed of a particular transmission which it is desired to receive and conversion may then take place to suit the printing or other storage equipment.

It is clear that for the system to be completely satisfactory, the final storage equipment must be capable of dealing with the highest speed for which it is desired to cater; for instance, the teleprinter or similar equipment may be arranged to operate at 75 bauds and the range with which the converter can then deal may be from 15 to 75 bauds.

According to the invention, an incoming signal is arranged to be sampled at the middle point of each element and corresponding storage takes place on a set of bi-stable storage elements. As soon as a complete character has been stored, the outgoing distributor, which is arranged to operate at the speed of the receiving teleprinter, is set in operation and the character is then transmitted to the teleprinter. Since in general the outgoing transmission will take place in a shorter time than the incoming storage, there is no reason why the first element of the next character should not start to be stored immediately and consequently only one set of storage devices is required. There will in fact be a pause after the outgoing character has been sent before the new incoming character is fully stored and further sending is initiated.

For the purpose of effecting automatic speed adjustment when required the position representing the stop signal is sampled twice and if the result of either of these operations proves that the sample is being taken from the start of any space signal of the same or the next character, i.e. a space instead of a mark, speed correction is applied. As a matter of convenience, this is arranged to be a speed increase so that use can be made of an electro-magnetically-operated mechanical stepping device which operates in one direction only and to ensure that during the final stages of speed adjustment, the start element of the next character is always sampled. Correction then takes place until the speeds are exactly the same. By this means, in as many steps as are necessary, the speed is adjusted until it coincides with the speed of the incoming signal and the setting is then locked so that it will not be altered subsequently due to the occurrence of an isolated distorted signal.

The invention will be better understood from the following description of one method of carrying it into effect which should be taken in conjunction with the accompanying drawing which shows a block diagram only.

The signal input applied to the input terminal I extends to the input relay IP which then serves to set the input toggle IT. This, when operated to the space position corresponding to a start signal, releases the hold toggle IHT which in turn operates on the oscillator hold circuit IH to permit the input oscillator or multivibrator IO to start. This then supplies sampling pulses to the incoming distributor ID, which preferably comprises three binary stages, in combination with a suitable matrix which causes potential to be applied to leads 1-5 successively in turn. The timing is such that when the speed is correct it is possible to sample the signal elements at their nominal mid-points. These pulses serve to open the gates G1-G5 in turn at instants corresponding to the mid-points of perfect signals. Thereupon, each time the input toggle is in the space condition during successive elements, setting is effected of the element stores ES1-ES5 which comprise suitable bi-stable devices and are set accordingly in turn. When the distributor reaches the fifth position corresponding to the storage of the fifth element, the hold toggle IHT is reversed to bring the input oscillator to rest and also the outgoing hold toggle OHT is released and thereupon by way of the outgoing oscillator hold circuit OH starts up the outgoing oscillator OO. This then supplies pulses to the outgoing distributor OD whereby the output toggle OT is caused to respond to signals from the element stores under the control of the distributor OD. This also may comprise three binary stages in association with a suitable matrix and it will be understood that the distributor will also include arrangements for re-inserting the start signal which does not need to be specifically stored. The output toggle effects corresponding operation of the output relay OR which over the output terminal O produces the necessary signal output which may serve to operate a teleprinter. When the stop signal has been sent under the control of store ES6, the hold toggle OHT is reversed and the operation of the outgoing distributor is arrested until the next character is fully stored.

Speed indicators SPI and SPO may be associated with the incoming and outgoing oscillators and these indicators are conveniently constituted by neon tubes.

The automatic speed adjusting equipment, which has not so far been referred to, is shown in the lower part of the figure and its function and method of operation will now be considered. While speed correction is taking place, the operation of the incoming distributor is modified under the control of the locking relay LR so that it does not apply potential to leads 1-5 in turn but merely makes a count of 8, the seventh and eighth pulses controlling the gate G7 so as to open it at times corresponding to the two sampling points of the stop signal at the speed at which the oscillator IO is then operating. Thus if the speed were 50 bauds, the sampling instants would be 130 and 150 milliseconds respectively from the commencement of the start element. If the input toggle is in a mark condition corresponding to a stop signal at these instants, nothing will pass through the gate G7 so that the speed adjusting arrangements do not come into operation.

If, however, the incoming signals have a speed different from the speed at which the input oscillator is running, the instants of sampling may fall within the start or any space signal in the next character. This is in line with the assumption already made that the input oscillator will always be arranged so that initially its speed is slower than the incoming signal speed. Consequently an output will be obtained from the gate G7 which will operate the speed control equipment SC and cause a pulse or pulses to be generated by PG and these pulses when transmitted to the speed control motor SM cause the speed of the input oscillator IO to be increased by one or more units. This operation will, if necessary, be repeated for subsequent characters until the sampling is found to take place satisfactorily during the occurrence of the stop signal. Thereupon after a short delay of a few characters to ensure that the correspondence of speed is not spurious, the locking relay LR is operated and switches the incoming distributor over to normal operation and releases the outgoing hold toggle OHT to permit outgoing characters to be transmitted now that they are being correctly received. It also serves after a further short delay introduced by the delay unit D to inhibit the gate G7 by way of the equipment SO so that the searching operation will not be resumed if a distorted signal is subsequently obtained. The stepping device or speed control motor may conveniently comprise the mechanism of a so-called coder, for instance as disclosed in Patent No. 2,849,568 granted Aug. 26, 1958 and effects its speed changing operation by alteration of resistance in the oscillator circuit.

As long as pulses are being produced by PG to effect a speed change, they are also being transmitted to the locking relay LR and produce an unlocking effect, that is they prevent it from becoming operative. When speed correction is no longer necessary however, these pulses cease and relay LR is then able to become effective to perform the functions described above.

When the equipment is being started up, the manual control button UL is operated and by way of the equipment SC sets PG in operation so that the motor SM moves to its initial position corresponding to a minimum speed of IO and the pulses produced also release LR so that the searching operation may become effective.

It will be appreciated that the equipment described is suitable for converting from 7 to 7½ unit code working and vice versa which may be a most valuable feature. This results from the fact that there is normally a period of waiting at the end of each character retransmitted and this provides the opportunity for the adjustment of the length of the stop signal as required. It will be clear also that the technique of sampling the incoming signals at the mid-point and subsequently producing signals of correct length gives a regenerating effect which may be very desirable.

The invention therefore provides a very simple solution to the problem of dealing readily with transmissions at different speeds and in addition is capable of searching for and locking on to a transmission the speed of which may not be known beforehand.

We claim:
1. In a start-stop telegraph system, a speed converter including in combination, means responsive to incoming signal characters, a first distributor switch, means responsive to the receipt of a start signal for causing said first distributor switch to perform a cycle of operation, means controlled by said first distributor switch for the sampling at their nominal mid-points of succeeding elements of a signal character having a total duration substantially equal to the cycle time of said first distributor switch, a set of storage devices corresponding in number to the number of information elements in said signal character, means for setting said storage devices respectively in accordance with the nature of the samples provided by said first distributor switch, a second distributor switch, means responsive to the sampling of the final information element of said signal character by said first distributor switch for causing said second distributor switch to perform a cycle of operation in a time period less than the cycle time of said first distributor switch, and signal generating means jointly controlled by said storage devices and said second distributor switch for producing a signal character corresponding to the elements sampled by said first distributor switch.

2. In a start-stop telegraph system, an automatic adjusting arrangement for signals incoming at different speeds including in combination, means responsive to incoming signals characters, a distributor switch, means controlled by said distributor switch for testing said incoming signal characters at instants corresponding to the nominal midpoints of information elements of said characters at the speed of said distributor switch, means controlled by said distributor switch for testing an incoming signal character at two successive instants separated by a period substantially equal to but less than the nominal length of the stop signal at the speed of said distributor switch, and means responsive to the result of said two stop signal tests for increasing the speed of said distributor switch if either test fails to encounter stop signal conditions.

3. In an arrangement as claimed in claim 2 the provision of means for inhibiting the testing of information elements as long as the speed adjustment of said distributor switch continues.

4. In an arrangement as claimed in claim 2, the provision of means for suppressing one of the stop signal tests shortly after the speed adjustment of said distributor switch is completed.

5. In an arrangement as claimed in claim 4, the provision of means for preventing any further speed adjustment of said distributor switch once it has been completed.

References Cited
UNITED STATES PATENTS

| | | | |
|---|---|---|---|
| 2,642,493 | 6/1953 | Locke et al. | 178—53.1 |
| 2,822,422 | 2/1958 | Terry et al. | 178—53.1 |
| 2,891,109 | 6/1959 | Steeneck | 178—70 |

NEIL C. READ, *Primary Examiner.*

THOMAS A. ROBINSON, *Examiner.*